US011292527B2

(12) United States Patent
Kamimura et al.

(10) Patent No.: US 11,292,527 B2
(45) Date of Patent: Apr. 5, 2022

(54) VEHICLE PILLAR STRUCTURE

(71) Applicant: TOYOTA JIDOSHA KABUSHIKI KAISHA, Aichi-ken (JP)

(72) Inventors: Shinya Kamimura, Toyota (JP); Toshiya Miyashita, Toyota (JP); Koki Ikeda, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 285 days.

(21) Appl. No.: 16/655,229

(22) Filed: Oct. 17, 2019

(65) Prior Publication Data
US 2020/0130477 A1 Apr. 30, 2020

(30) Foreign Application Priority Data
Oct. 26, 2018 (JP) .............................. JP2018-202210

(51) Int. Cl.
*B62D 25/04* (2006.01)
*B60J 1/08* (2006.01)
*B62D 27/02* (2006.01)

(52) U.S. Cl.
CPC ................ *B62D 25/04* (2013.01); *B60J 1/08* (2013.01); *B62D 27/02* (2013.01)

(58) Field of Classification Search
CPC .................................. B60J 1/08; B62D 25/04
USPC ..................................................... 296/193.06
See application file for complete search history.

(56) References Cited

U.S. PATENT DOCUMENTS

| 5,741,044 | A | * | 4/1998 | Kawai | ................. | B60R 13/0206 |
| | | | | | | 296/187.05 |
| 5,772,277 | A | | 6/1998 | Fukuda | | |
| 10,689,038 | B2 | * | 6/2020 | Ikeda | ......................... | B60J 1/10 |
| 10,710,641 | B2 | * | 7/2020 | Ikeda | ................... | B62D 29/007 |
| 10,723,304 | B2 | * | 7/2020 | Tanaka | ................... | B60R 21/215 |

(Continued)

FOREIGN PATENT DOCUMENTS

| CN | 101031463 A | 9/2007 |
| CN | 102686474 A | 9/2012 |

(Continued)

OTHER PUBLICATIONS

Extended European Search Report in EP Application No. 19204695.1, dated Apr. 2, 2020, 9pp.

*Primary Examiner* — Jason S Morrow
(74) *Attorney, Agent, or Firm* — Hauptman Ham, LLP

(57) ABSTRACT

A vehicle pillar structure including a first column, a second column, and a transparent member. The first column includes a first framework member in a substantially plate shape extending along a vehicle vertical direction, and a second framework member in a substantially plate shape extending along the vehicle vertical direction and opposite the first framework member. The second column is at the vehicle rear side of the first column with a spacing between the first column and the second column, and includes a third framework member in a substantially plate shape extending along the vehicle vertical direction, and a fourth framework member in a substantially plate shape extending along the vehicle vertical direction, and opposite the third framework member. The transparent member spans between the first column and the second column, and enables outside of a vehicle to be seen when viewed from a driving seat side.

7 Claims, 3 Drawing Sheets

(56) References Cited

U.S. PATENT DOCUMENTS

| | | | | |
|---|---|---|---|---|
| 10,745,057 B2* | 8/2020 | Ikeda | .................... | B62D 29/005 |
| 10,766,541 B2* | 9/2020 | Ikeda | .......................... | B60J 1/06 |
| 10,857,859 B2* | 12/2020 | Ikeda | ..................... | B60J 5/0422 |
| 11,097,783 B2* | 8/2021 | Ikeda | ..................... | B62D 25/08 |
| 11,142,255 B2* | 10/2021 | Ikeda | ..................... | B62D 25/04 |
| 11,148,726 B2* | 10/2021 | Kamimura | ............. | B62D 27/02 |
| 2013/0193716 A1 | 8/2013 | Kurokawa | | |
| 2016/0368537 A1 | 12/2016 | Toyota | | |
| 2020/0148273 A1* | 5/2020 | Ikeda | .................... | B60R 13/025 |
| 2020/0172168 A1* | 6/2020 | Kamimura | ............. | B62D 25/04 |
| 2021/0188361 A1* | 6/2021 | Ishikawa | ................ | B62D 65/02 |

FOREIGN PATENT DOCUMENTS

| | | | |
|---|---|---|---|
| DE | 19533781 | A1 | 3/1996 |
| DE | 102014204194 | A1 | 9/2014 |
| EP | 1770002 | A1 | 4/2007 |
| JP | S5873476 | A | 5/1983 |
| JP | H240616 | U | 3/1990 |
| JP | 2007308014 | A | 11/2007 |
| JP | 20086836 | A | 1/2008 |
| JP | 2011-183848 | A | 9/2011 |
| JP | 2013112077 | A | 6/2013 |
| JP | 2014172497 | A | 9/2014 |
| JP | 2017-7509 | A | 1/2017 |

* cited by examiner

VEHICLE PILLAR STRUCTURE

CROSS-REFERENCE TO RELATED APPLICATION

This application claims priority under 35 USC 119 from Japanese Patent Application No. 2018-202210, filed on Oct. 26, 2018, the disclosure of which is incorporated by reference herein in its entirety.

BACKGROUND

Technical Field

The present disclosure relates to a vehicle pillar structure.

Related Art

Japanese Patent Application Laid-Open (JP-A) No. 2017-7509 discloses an invention relating to a vehicle pillar structure. In this vehicle pillar structure, a front pillar framework is configured from a hollow, substantially rectangular column shaped transparent member. Respective retention portions are provided at a vehicle width direction inner side and vehicle width direction outer side of the transparent member. This enables a driver to see a target object on the far side of the front pillar through the transparent member between the two retention portions.

However, in the vehicle pillar structure disclosed in JP-A No. 2017-7509, the two retention portions are each formed with a substantially L-shaped cross-section as sectioned orthogonally to the length direction of the front pillar. In order to improve collision performance in a frontal vehicle collision (referred to hereafter simply as "frontal collision"), it is desirable to raise the bending rigidity of the front pillar by configuring retention members in tube shapes so as to reduce the deformation amount of the front pillar. However, configuring retention members in tube shapes would increase the width of the front pillar itself, narrowing the field of vision of the driver. The technology according to JP-A No. 2017-7509 accordingly leaves room for improvement in this respect.

SUMMARY

The present disclosure obtains a vehicle pillar structure capable of both securing a wide field of vision when driving a vehicle, and improving collision performance in a frontal collision.

Solution to Problem

A vehicle pillar structure of a first aspect of the present disclosure includes a first column, a second column, and a transparent member. The first column that configures a part of a front pillar, that includes a first framework member formed in a substantially plate shape extending along substantially a vehicle vertical direction, that includes a second framework member formed in a substantially plate shape extending along substantially the vehicle vertical direction and opposing the first framework member, and that is configured in a tube shape wherein vehicle front side end portions of the first framework member and the second framework member are superimposed and welded together and flanges at vehicle rear side end portions of the first framework member and the second framework member are welded together. The second column that configures another part of the front pillar and is disposed at a vehicle rear side of the first column with a predetermined spacing between the first column and the second column, that includes a third framework member formed in a substantially plate shape extending along substantially the vehicle vertical direction, that includes a fourth framework member formed in a substantially plate shape extending along substantially the vehicle vertical direction and opposing the third framework member, and that is configured in a tube shape wherein vehicle front side end portions of the third framework member and the fourth framework member are superimposed and welded together and flanges at vehicle rear side end portions of the third framework member and the fourth framework member are welded together, and a transparent member that extends between the first column and the second column, and that enables an exterior environment of a vehicle to be seen when viewed from a driving seat side.

In the first aspect, the vehicle pillar structure includes the first column, the second column, and the transparent member. The first column configures part of the front pillar, and includes the first framework member and the second framework member. The first framework member is formed in a substantially plate shape extending along substantially the vehicle vertical direction. The second framework member is formed in a substantially plate shape extending along substantially the vehicle vertical direction similarly to the first framework member, and opposes the first framework member. The first framework member and the second framework member are joined by superimposing and welding together the vehicle front side end portions, and are also joined by welding together the flanges at the vehicle rear side end portions. Namely, flanges are not required in order to join the first framework member and the second framework member together at the vehicle front side of the first column. This enables the width of the first column to be made narrower. The second column configures another part of the front pillar, is disposed at the vehicle rear side of the first column with the predetermined spacing therebetween, and includes the third framework member and the fourth framework member. The third framework member is formed in a substantially plate shape extending along substantially the vehicle vertical direction. The fourth framework member is formed in a substantially plate shape extending along substantially the vehicle vertical direction similarly to the third framework member, and is disposed opposing the third framework member. The third framework member and the fourth framework member are joined by superimposing and welding together the vehicle front side end portions, and also are joined by welding together the flanges at the vehicle rear side end portions. Namely, similarly to the first column, flanges are not required in order to join the third framework member and the fourth framework member together at the vehicle front side of the second column. This enables the width of the second column to be made narrower. A wider field of vision can be obtained for a driver due to the overall width of the front pillar being narrower, and the driver is able to see a target object on the far side of the front pillar through the transparent member spanning between the first column and the second column, thereby enabling an even wider field of vision to be obtained.

In a frontal collision, when collision load is input to the front pillar, the front pillar buckles into a shape protruding toward substantially the vehicle upper side in vehicle side view. Accordingly; a load stretching the front pillar along its extension direction acts on a vehicle front portion of the first column and a vehicle front portion of the second column. Note that since the respective vehicle front portions of the first column and the second column are superimposed and welded and so do not include flanges projecting toward the outside of the front pillar from the first column and the second column, such flanges can be suppressed from acting as fracture origins due to a concentration of stress at flange leading ends. Namely, configuring the first column and the second column in tube shapes enables bending rigidity to be raised while suppressing fracturing when collision load is input in a frontal collision.

Note that "superimposing and welding" refers to welding by joining in a state in which the respective vehicle front side end portions of the first framework member and the second framework member, and of the third framework member and the fourth framework member, are overlapping in their plate thickness directions without projecting toward the outside of the front pillar.

Moreover "welding together flanges" refers to welding by joining together flanges in a state in which the respective vehicle rear side end portions of the first framework member and the second framework member, and of the third framework member and the fourth framework member, include flanges projecting toward the outside of the front pillar, and the respective flanges are overlapping in their plate thickness directions.

A vehicle pillar structure of a second aspect of the present disclosure is the first aspect, wherein a superimposed welding location of the first column and a superimposed welding location of the second column are provided at positions that do not overlap respective ridge lines extending along respective extension directions of the first column and the second column.

In the second aspect, the superimposed welding locations of the first column and the second column are provided at positions that do not overlap the ridge lines of the first column and the second column. The ridge lines extend along the respective extension directions of the first column and the second column, and collision load is concentrated thereon in a frontal collision. Namely, since the superimposed welding locations are provided at locations other than the respective ridge lines, collision load does not concentrate at the welding locations, these being locations that are generally more vulnerable to fracture. This thereby enables fracture of the front pillar to be suppressed when collision load is input in a frontal collision.

A vehicle pillar structure of a third aspect of the present disclosure is the second aspect, wherein a vehicle width direction outer side portion of the second column is comprises the fourth framework member, which is configured from high tensile sheet steel, and a plurality of ridge lines of the fourth framework member are disposed at a vehicle width direction outer side of the superimposed welding location of the second column.

In the third aspect, since the plural ridge lines of the fourth framework member are disposed at the vehicle width direction outer side of the superimposed welding location of the second column, when collision load is input to the front pillar in a frontal collision, the collision load concentrates at the ridge lines of the fourth framework member instead of at the superimposed welding location. The fourth framework member is configured from high tensile sheet steel, thus enabling the collision load that concentrates at the ridge lines to be effectively dispersed.

A vehicle pillar structure of a fourth aspect of the present disclosure is any one of the first aspect to the third aspect, wherein a side member outer panel is joined to a vehicle width direction outer side portion of the second column, and a superimposed welding location of the second column is provided at a portion other than the portion to which the side member outer panel is joined.

In the fourth aspect, the side member outer panel is joined to a vehicle width direction outer side location of the second column, and the superimposed welding location of the second column is provided at a location other than the location at which the side member outer panel is joined to the second column. Namely, there is no need to weld the side member outer panel at the same time as superimposing and welding together the third framework member and the fourth framework member of the second column, enabling the welding to be simplified.

A vehicle pillar structure of a fifth aspect of the present disclosure is any one of the first aspect to the fourth aspect, wherein a superimposed welding location of the second column is inclined in a direction away from the first column in vehicle plan view.

In the fifth aspect, since the superimposed welding location of the second column is inclined in a direction away from the first column in vehicle plan view, the superimposed welding location of the second column is less visible to the driver when the driver is viewing a target object on the far side of the front pillar through the transparent member between the first column and the second column. Namely, the superimposed welding location of the second column can be made less noticeable.

A vehicle pillar structure of a sixth aspect of the present disclosure is any one of the first aspect to the fifth aspect, wherein a molding member is attached to a portion, of a vehicle inner face of the transparent member, that overlaps the first column, and the molding member is provided with a front screening portion that is separated from, and on the second column side of, a superimposed welding location of the first column and that extends such that a leading end portion of the front screening portion approaches or abuts the first column.

In the sixth aspect, the molding member is attached to a location of the vehicle inner face of the transparent member that overlaps the first column, and the molding member is provided with the front screening portion. The front screening portion is spaced apart from and on the second column side of the superimposed welding location of the first column, and extends such that the leading end portion approaches or abuts the first column. Accordingly, the superimposed weld of the first column is covered from the second column side, namely the vehicle rear side, by the front screening portion. The superimposed welding location of the first column can accordingly be made less noticeable when the driver views a target object on the far side of the front pillar through the transparent member between the first column and the second column, and when the first column is viewed from outside the vehicle through the transparent member.

A vehicle pillar structure of a seventh aspect of the present disclosure is any one of the first aspect to the sixth aspect, wherein a molding member is attached to a portion, of a vehicle inner face of the transparent member, that overlaps the second column, and the molding member is provided with a rear screening portion that is separated from, and on the first column side of, a superimposed welding location of the second column and that extends such that a leading end portion of the rear screening portion approaches or abuts the second column.

In the seventh aspect, the molding member is attached to a location of the vehicle inner face of the transparent member that overlaps the second column, and the molding member is provided with the rear screening portion. The rear screening portion is spaced apart from and on the first column side of the superimposed welding location of the second column, and extends such that the leading end portion approaches or abuts the second column. Accordingly, the superimposed weld of the second column is covered from the first column side, namely the vehicle front side, by the rear screening portion. The superimposed welding location of the second column can accordingly be made less noticeable when the driver views a target object on the far side of the front pillar through the transparent member between the first column and the second column, and when the second column is viewed from outside the vehicle through the transparent member.

As explained above, the vehicle pillar structure according to the first aspect enables both a wide field of vision to be secured when driving the vehicle, and improved collision performance in a frontal collision.

The vehicle pillar structures according to the second and third aspects enable improved collision performance in a frontal collision.

The vehicle pillar structure according to the fourth aspect enables manufacturing efficiency to be improved.

The vehicle pillar structures according to the fifth to seventh aspects enable external styling properties to be improved.

BRIEF DESCRIPTION OF THE DRAWINGS

Exemplary embodiments of the present disclosure will be described in detail based on the following figures, wherein.

DETAILED DESCRIPTION

Figure 1:
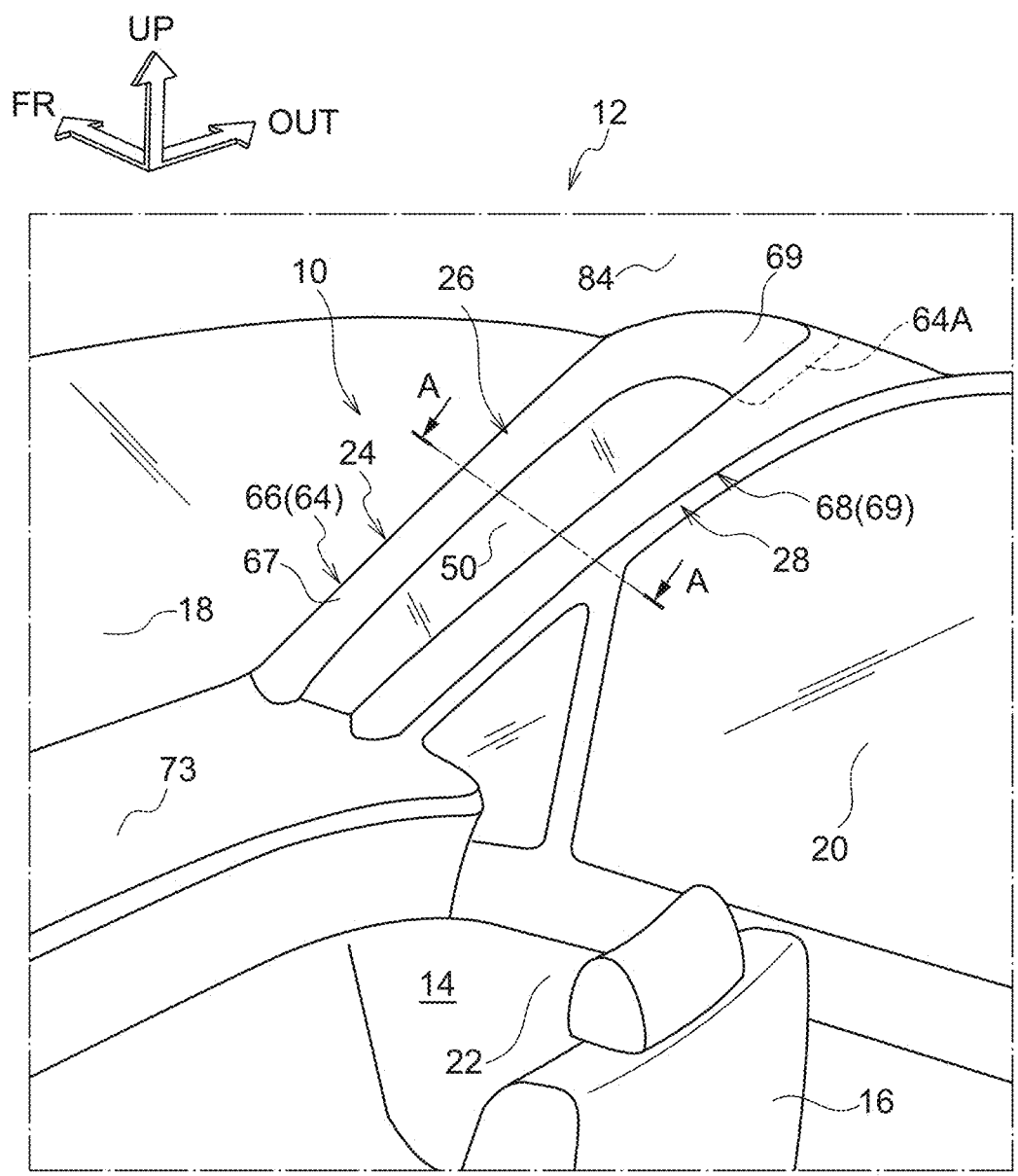
FIG. 1 is a schematic perspective view illustrating a cabin interior of a vehicle including a vehicle pillar structure according to an exemplary embodiment.
Figure 2:
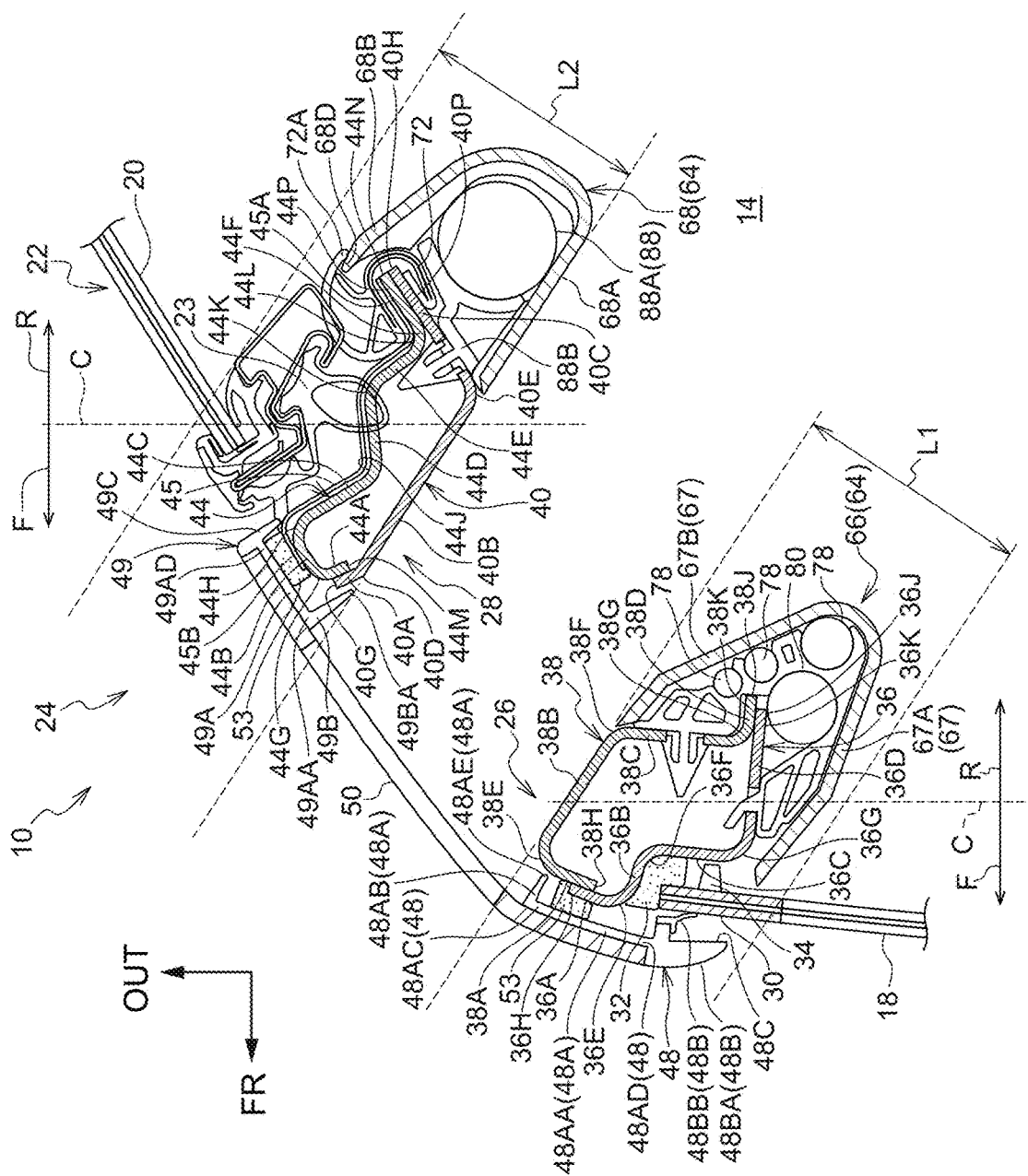
FIG. 2 is an enlarged cross-section illustrating a state sectioned along line A-A in FIG. 1.
Figure 3:
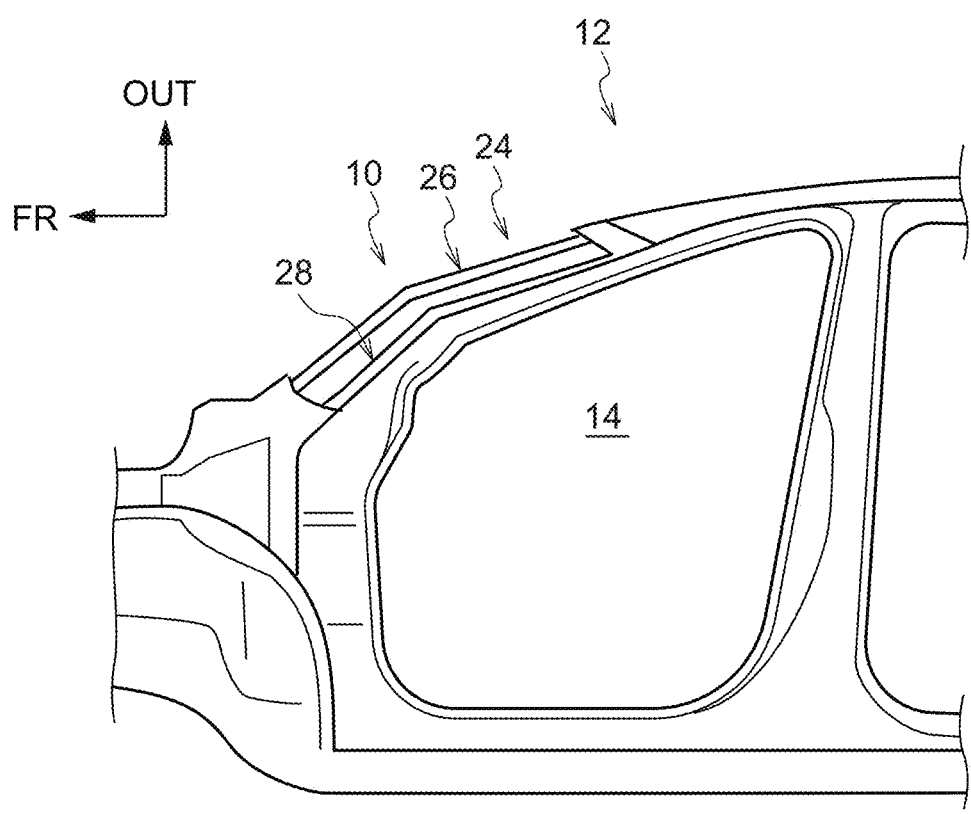
FIG. 3 is a schematic side view illustrating a state in a frontal collision of a vehicle body including a vehicle pillar structure according to an exemplary embodiment.

Explanation follows regarding an exemplary embodiment of a vehicle pillar structure according to the present disclosure, with reference to FIG. 1 to FIG. 3. In the drawings, the arrow FR indicates a vehicle front-rear direction front side, the arrow OUT indicates a vehicle width direction outer side, and the arrow UP indicates a vehicle vertical direction upper side.

Overall Configuration

As illustrated in FIG. 1, a pair of left and right vehicle seats 16 are installed at a vehicle front side inside a vehicle cabin 14 of a vehicle 12 applied with a vehicle pillar structure 10 according to the present exemplary embodiment. One of the vehicle seats 16 seats a driver, not illustrated in the drawings. As an example, the vehicle 12 of the present exemplary embodiment is a left-hand drive vehicle, and the vehicle seat 16 on the driving seat side is omitted from illustration in the drawings.

Front windshield glass (referred to hereafter simply as "front glass") 18 is provided at the vehicle front side of the vehicle seats 16. The front glass 18 is a see-through window member with its plate thickness direction in substantially the vehicle front-rear direction, and separates the inside of the vehicle cabin 14 from the outside of the vehicle cabin 14. Although not illustrated in the drawings, in side view the front glass 18 is inclined toward the vehicle rear side on progression toward the vehicle upper side. An upper end portion of the front glass 18 is connected to a front header configuring a front end portion of a roof configured including a roof panel (none of these elements are illustrated in the drawings). A lower end portion of the front glass 18 is disposed opposing a rear end portion of a hood in the vehicle front-rear direction, the hood being provided at the vehicle front side to cover a power unit compartment from the vehicle upper side, and is also connected to a cowl extending along the vehicle width direction (none of these elements are illustrated in the drawings).

The front glass 18 is formed with a uniform plate thickness and has a gently curving profile, such that a vehicle width direction intermediate portion of the front glass 18 bulges toward the vehicle front side. A pair of left and right front pillars 24 are respectively provided at the vehicle front sides of front doors 22 located at the vehicle width direction outer sides of the front glass 18 and including front side windows 20.

The pair of left and right front pillars 24 each extends with its length direction along substantially the vehicle vertical direction so as to follow a vehicle width direction end portion of the front glass 18. Namely, the pair of left and right front pillars 24 are inclined toward the vehicle rear side on progression toward the vehicle upper side. Although explanation follows regarding the front pillar 24 on a front passenger seat side, the front pillar 24 on the opposite side to the front passenger seat (on the driving seat side) has a similar configuration.

First Column

As illustrated in FIG. 2, the front pillar 24 includes a first column 26 and a second column 28. The first column 26 extends along substantially the vehicle vertical direction, and a vehicle width direction end portion 30 of the front glass 18 is joined to the first column 26 using a urethane adhesive 32 and cushioning rubber 34. The first column 26 is configured including a first pillar inner panel 36 configured from sheet steel and serving as a first framework member, and a first pillar outer panel 38 configured from sheet steel and serving as a second framework member. The first pillar inner panel 36 extends along substantially the vehicle vertical direction and is formed with a substantially crank shaped cross-section profile as sectioned orthogonally to its length direction (an extension direction running along substantially the vehicle vertical direction). More specifically, the first pillar inner panel 36 is configured by a first wall 36A, a second wall 36B, a third wall 36C, and a fourth wall 36D. The first wall 36A is positioned at the vehicle front side of the first pillar inner panel 36 and extends along substantially the vehicle width direction. The second wall 36B extends from an inner end portion of the first wall 36A toward substantially the vehicle rear side. The third wall 36C extends from a rear end portion of the second wall 36B toward substantially the vehicle width direction inner side. The fourth wall 36D extends from an inner end portion of the third wall 36C toward substantially the vehicle rear side.

A ridge line 36E is provided between the first wall 36A and the second wall 36B. The ridge line 36E configures a boundary line between the first wall 36A and the second wall 36B, and extends along substantially the vehicle vertical direction. Note that in the present exemplary embodiment, a curved rounded portion is present between the first wall 36A and the second wall 36B, with a curving direction center of the rounded portion configuring the ridge line 36E.

Ridge lines 36F, 36G are respectively provided between the second wall 369 and the third wall 36C, and between the third wall 36C and the fourth wall 36D. The ridge line 36F is a boundary line between the second wall 36B and the third wall 36C, and the ridge line 36G is a boundary line between the third wall 36C and the fourth wall 36D. The ridge lines 36F, 36G each extend along substantially the vehicle vertical direction. Note that in the present exemplary embodiment, curved rounded portions are present between the second wall 36B and the third wall 36C and between the third wall 36C and the fourth wall 36D, and the curving direction centers of the respective rounded portions configure the ridge lines 36F, 36G, similarly to in the case of the ridge line 36E.

The first pillar outer panel 38 extends along substantially the vehicle vertical direction, and is configured with a substantially U-shaped cross-section profile opening toward substantially the vehicle width direction inner side as sectioned orthogonally to its length direction (an extension direction running along substantially the vehicle vertical direction). Specifically, the first pillar outer panel 38 is configured by a first wall 38A, a second wall 38B, a third wall 38C, and a fourth wall 38D. The first wall 38A is positioned at the vehicle front side of the first pillar outer panel 38 and extends along substantially the vehicle width direction. The second wall 38B extends from an outer end portion of the first wall 38A toward substantially the vehicle rear side and the vehicle width direction inner side. The third wall 38C extends from a rear end portion of the second wall 38B toward substantially the vehicle width direction inner side. The fourth wall 38D extends from an inner end portion of the third wall 38C toward substantially the vehicle rear side.

A ridge line 38E is provided between the first wall 38A and the second wall 38B. The ridge line 38E is a boundary line between the first wall 38A and the second wall 38B, and extends along substantially the vehicle vertical direction. Note that in the present exemplary embodiment, a curved rounded portion is present between the first wall 38A and the second wall 38B, and the curving direction center of the rounded portion configures the ridge line 38E.

Ridge lines 38F, 38G are respectively provided between the second wall 383 and the third wall 38C, and between the third wall 38C and the fourth wall 38D. The ridge line 38F is a boundary line between the second wall 38B and the third wall 38C, and the ridge line 38G is a boundary line between the third wall 38C and the fourth wall 38D. The ridge lines 38F, 38G each extend along substantially the vehicle vertical direction. Note that in the present exemplary embodiment, curved rounded portions are present between the second wall 38B and the third wall 38C and between the third wall 38C and the fourth wall 38D, and the curving direction centers of the respective rounded portions configure the ridge lines 38F, 38G, similarly to in the case of the ridge line 38E.

The first pillar inner panel 36 and the first pillar outer panel 38 are provided opposing each other in their plate thickness directions, and a closed cross-section is formed by joining together respective vehicle front side end portions 36H, 38H, and joining together respective vehicle rear side end portions 36J, 38J. Namely, the vehicle front side end portion 36H of the first pillar inner panel 36 configures a leading end of the first wall 36A of the first pillar inner panel 36. The vehicle rear side end portion 36J of the first pillar inner panel 36 configures a leading end of a flange 36K extending continuously from the fourth wall 36D of the first pillar inner panel 36 toward the vehicle rear side.

The vehicle front side end portion 3811 of the first pillar outer panel 38 configures a leading end of the first wall 38A of the first pillar outer panel 38. The vehicle rear side end portion 38J of the first pillar outer panel 38 configures a leading end of a flange 38K extending continuously from the fourth wall 38D of the first pillar outer panel 38 toward the vehicle rear side. The vehicle front side end portion 3611 of the first pillar inner panel 36 is welded to the vehicle front side end portion 38H of the first pillar outer panel 38 in a state overlapping the end portion 38H in substantially the vehicle front-rear direction. Namely, the end portion 38H of the first pillar outer panel 38 and the end portion 36H of the first pillar inner panel 36 are welded together in a state superimposed on one another. Note that the location where the end portion 38H of the first pillar outer panel 38 and the end portion 36H of the first pillar inner panel 36 are superimposed and welded together is referred to hereafter as the "first column superimposed welding portion".

The vehicle rear side end portion 38J of the first pillar outer panel 38 is welded to the vehicle rear side end portion 36J of the first pillar inner panel 36 in a state overlapping in the vehicle width direction. Namely, the end portion 36J (flange 36K) of the first pillar inner panel 36 and the end portion 38J (flange 38K) of the first pillar outer panel 38 are welded together at the flanges. The first column 26 is formed in a tube shape by welding in this manner.

Second Column

The second column 28 is disposed at substantially the vehicle rear side of the first column 26. Specifically, the second column 28 is disposed such that there is a predetermined spacing between the second column 28 and the first column 26 in substantially the vehicle front-rear direction. The predetermined spacing is set to at least an inter-pupillary distance of the driver sifting in the vehicle seat 16 (see FIG. 1). Note that the "inter-pupillary distance" refers to the distance between the center of the pupil of the left eye (not illustrated in the drawings) and the center of the pupil of the right eye (not illustrated in the drawings) of the driver. For example, in the case of a Japanese adult, the inter-pupillary distance is approximately 60 mm to 65 mm. In the present exemplary embodiment, the predetermined spacing is set to 65 mm as an example.

The second column 28 extends substantially parallel to the first column 26 (along substantially the vehicle vertical direction), and is configured including a second pillar inner panel 40 configured from sheet steel and serving as a third framework member, and a second pillar outer panel 44 configured from high tensile sheet steel and serving as a fourth framework member. The second pillar inner panel 40 extends along substantially the vehicle vertical direction and is configured with a substantially L-shaped cross-section profile as sectioned orthogonally to the length direction (an extension direction along substantially the vehicle vertical direction). More specifically, the second pillar inner panel 40 is configured by a first wall 40A, a second wall 40B, and a third wall 40C. The first wall 40A is positioned at the vehicle front side of the second pillar inner panel 40 and extends along substantially the vehicle width direction. The second wall 40B extends from an inner end portion of the first wall 40A toward substantially the vehicle rear side and toward substantially the vehicle width direction inner side. The third wall 40C extends from a rear end portion of the second wall 40B toward substantially the vehicle rear side and toward substantially the vehicle width direction outer side.

A ridge line 40D is provided between the first wall 40A and the second wall 40B. The ridge line 40D is a boundary line between the first wall 40A and the second wall 40B, and extends along substantially the vehicle vertical direction.

A ridge line 40E is provided between the second wall 40B and the third wall 40C. The ridge line 40E is a boundary line between the second wall 40B and the third wall 40C. The ridge line 40E extends along substantially the vehicle vertical direction. Note that in the present exemplary embodiment, a curved rounded portion is present between the second wall 40B and the third wall 40C, and a curving direction center of the rounded portion configures the ridge line 40E.

The second pillar outer panel 44 extends along substantially the vehicle vertical direction and is configured with a substantially crank shaped cross-section profile as sectioned orthogonally to its length direction. Specifically, the second pillar outer panel 44 is configured by a first wall 44A, a second wall 44B, a third wall 44C, a fourth wall 44D, a fifth wall 44E, and a sixth wall 44F. The first wall 44A is positioned at the vehicle front side of the second pillar outer panel 44 and extends along substantially the vehicle width direction. The second wall 44B extends from an outer end portion of the first wall 44A toward substantially the vehicle rear side and toward substantially the vehicle width direction outer side. The third wall 44C extends from a rear end portion of the second wall 44B toward substantially the vehicle rear side and toward substantially the vehicle width direction inner side. The fourth wall 44D extends from an inner end portion of the third wall 44C toward substantially the vehicle rear side. The fifth wall 44E extends from a rear end portion of the fourth wall 44D toward substantially the vehicle rear side and toward substantially the vehicle width direction inner side. The sixth wall 44F extends from an inner end portion of the fifth wall 44E toward substantially the vehicle rear side and toward substantially the vehicle width direction outer side.

A ridge line 44G is provided between the first wall 44A and the second wall 44B. The ridge line 44G configures a boundary line between the first wall 44A and the second wall 44B, and extends along substantially the vehicle vertical direction. Note that in the present exemplary embodiment, a curved rounded portion is present between the first wall 44A and the second wall 44B, with a curving direction center of the rounded portion configuring the ridge line 44G.

Ridge lines 44H, 44J, 44K, 44L are respectively provided between the second wall 44B and the third wall 44C, between the third wall 44C and the fourth wall 44D, between the fourth wall 44D and the fifth wall 44E, and between the fifth wall 44E and the sixth wall 44F. The ridge line 44H is a boundary line between the second wall 44B and the third wall 44C. The ridge line 44J is a boundary line between the third wall 44C and the fourth wall 44D. The ridge line 44K is a boundary line between the fourth wall 44D and the fifth wall 44E. The ridge line 44L is a boundary line between the fifth wall 44E and the sixth wall 44F. The ridge lines 44H, 44J, 44K, 44L each extend along substantially the vehicle vertical direction. Note that in the present exemplary embodiment, curved rounded portions are present between the second wall 44B and the third wall 44C, between the third wall 44C and the fourth wall 44D, between the fourth wall 44D and the fifth wall 44E, and between the fifth wall 44E and the sixth wall 44F. Curving direction centers of the respective rounded portions configure the ridge lines 44H, 44J, 44K, 44L, similarly to in the case of the ridge line 44G.

The second pillar inner panel 40 and the second pillar outer panel 44 are provided opposing each other in their plate thickness directions, and a closed cross-section is formed by joining together respective vehicle front side end portions 40G, 44M, and joining together respective vehicle rear side end portions 40I1, 44N. Namely, the vehicle front side end portion 40G of the second pillar inner panel 40 configures a leading end of the first wall 40A of the second pillar inner panel 40. The vehicle rear side end portion 40H of the second pillar inner panel 40 configures a leading end of a flange 40P extending continuously from the third wall 40C of the second pillar inner panel 40 toward substantially the vehicle rear side.

The vehicle front side end portion 44M of the second pillar outer panel 44 configures a leading end of the first wall 44A of the second pillar outer panel 44. The vehicle rear side end portion 44N of the second pillar outer panel 44 configures a leading end of a flange 44P extending continuously from the sixth wall 44F of the second pillar outer panel 44 toward substantially the vehicle rear side. The vehicle front side end portion 40G of the second pillar inner panel 40 is welded to the vehicle front side end portion 44M of the second pillar outer panel 44 in a state overlapping in substantially the vehicle front-rear direction. Namely, the end portion 44M of the second pillar outer panel 44 and the end portion 40G of the second pillar inner panel 40 are superimposed on one another and welded together.

The vehicle rear side end portion 44N of the second pillar outer panel 44 is welded to the vehicle rear side end portion 40H of the second pillar inner panel 40 in a state overlapping in substantially the vehicle width direction. Namely, the end portion 40H (flange 40P) of the second pillar inner panel 40 and the end portion 44N (flange 44P) of the second pillar outer panel 44 are welded together at the flanges. The second column 28 is formed in a tube shape by welding in this manner.

A side member outer panel 45 is joined to the vehicle width direction outer side of the second pillar outer panel 44. A vehicle rear side end portion 45A of the side member outer panel 45 is welded to the flange 44P of the second pillar outer panel 44 from the vehicle width direction outer side. A vehicle front side end portion 45B of the side member outer panel 45 is welded to the second wall 44B of the second pillar outer panel 44 from the vehicle width direction outer side. Namely, the location of the second pillar outer panel 44 where the side member outer panel 45 is joined thereto (referred to hereafter as the "side member welding portion") and the location where the end portion 44M of the second pillar outer panel 44 and the end portion 40G and the second pillar inner panel 40 are superimposed and welded together (referred to hereafter as the "second column superimposed welding portion") are at different positions to each other, the side member welding portion being provided further toward the vehicle width direction outer side than the second column superimposed welding portion.

An opening trim 72 is attached to a location where the vehicle rear side end portion 40I1 of the second pillar inner panel 40 and the vehicle rear side end portion 44N of the second pillar outer panel 44 abut each other, namely the location where the flange 40P and the flange 44P are joined together. A seal member 23 of the front door 22 is capable of abutting the second pillar outer panel 44. Width dimensions L1, L2 of the first column 26 and the second column 28 in a state viewed along a substantially horizontal direction from the perspective of the driver (not illustrated in the drawings), are each set to no greater than the inter-pupillary distance of the driver.

Transparent Member

Front pillar outer glass 50, serving as a transparent member, is provided at substantially the vehicle width direction outer side so as to span between the first column 26 and the second column 28 using a urethane adhesive 53, and a front molding 48 and a rear molding 49, serving as a molding members, described below. The front pillar outer glass 50 is a see-through window member made of glass with its plate thickness direction running along substantially the vehicle width direction. In side view, the front pillar outer glass 50 is inclined toward the vehicle rear side on progression toward the vehicle upper side (see FIG. 1). Note that the configuration of the front pillar outer glass 50 is not limited to glass, and the front pillar outer glass 50 may be configured from a see-through fiber reinforced plastic or the like.

Front Molding

The front molding 48 is attached to the front pillar outer glass 50. The front molding 48 is, for example, made from rubber, and is attached along substantially the vehicle vertical direction, specifically following a peripheral edge portion on the front glass 18 side of the front pillar outer glass 50. The front molding 48 includes a join portion 48A and a closing-off portion 48B, The join portion 48A includes a join body 48AA and a front screening portion 48AB. The join body 48AA is a plate shaped member that is joined to a back face side of the peripheral edge portion of the front pillar outer glass 50.

The front screening portion 48AB projects from a vehicle rear side end portion 48AC of the join body 48AA toward the vehicle cabin 14, and a leading end portion 48AE of the front screening portion 48AB approaches the first pillar outer panel 38. Note that the front screening portion 48AB is disposed spaced apart from and on the second column 28 side of the first column superimposed welding portion.

The urethane adhesive 53 is provided between the join portion 48A and the first pillar outer panel 38 and first pillar inner panel 36. The join portion 48A, and thus the front pillar outer glass 50, is fixed to the first column 26 through the urethane adhesive 53. The urethane adhesive 53 is suppressed from oozing out toward substantially the vehicle rear side by the front screening portion 48AB of the join portion 48A.

The closing-off portion 48B is provided to a vehicle front side end portion 48AD of the join portion 48A, and is formed with a substantially C-shaped cross-section profile opening toward substantially the vehicle width direction inner side. Namely, a vehicle front side portion 48BA of the closing-off portion 48B projects from the peripheral edge portion of the front pillar outer glass 50 toward the vehicle width direction inner side continuously to the front pillar outer glass 50. A vehicle rear side portion 48BB of the closing-off portion 48B is biased toward and abuts a vehicle outer face of the peripheral edge portion of the front glass 18.

A gutter shaped location 48C opening toward substantially the vehicle width direction inner side is provided between the vehicle front side portion 48BA and vehicle rear side portion 48BB of the closing-off portion 48B. The gutter shaped location 48C is provided extending along substantially the vehicle vertical direction following the peripheral edge portion of the front pillar outer glass 50.

Rear Molding

The rear molding 49 is attached to a peripheral edge portion on the vehicle rear side of the front pillar outer glass 50. The rear molding 49 is, for example, made from rubber, and extends along substantially the vehicle vertical direction. The rear molding 49 includes a join body 49A, a rear screening portion 49B, and a hook-back portion 49C, and is formed with a substantially U-shaped cross-section profile opening toward substantially the vehicle width direction inner side as sectioned orthogonally to its length direction.

The join body 49A is configured by a plate shaped member joined to a back face side of the peripheral edge portion of the front pillar outer glass 50. The rear screening portion 49B projects from a substantially vehicle front side end portion 49AA of the join body 49A toward the vehicle cabin 14 side. The rear screening portion 49B is disposed opposing the second column superimposed welding portion in substantially the vehicle front-rear direction. Namely, the rear screening portion 493 is disposed spaced apart from and on the first column 26 side of the second column superimposed welding portion. Moreover, a leading end portion 49BA of the rear screening portion 49B approaches the second pillar inner panel 40 and thus the second column 28.

The hook-back portion 49C projects from a substantially vehicle rear side end portion 49AD of the join body 49A toward the vehicle cabin 14. Note that the hook-back portion 49C also projects from the end portion 48AD toward substantially the vehicle width direction outer side so as to cover a substantially vehicle rear side end face of the front pillar outer glass 50.

Front Pillar Garnish

A front pillar garnish 64 is provided at the vehicle width direction inner side of the first column 26 and the second column 28. The front pillar garnish 64 is made of resin, and is configured including a front garnish 66 provided at the vehicle cabin inner side of the first column 26, and a rear garnish 68 provided at the vehicle cabin inner side of the second column 28.

As illustrated in FIG. 1, the front garnish 66 includes a body 67 extending along substantially the vehicle vertical direction following the first column 26 illustrated in FIG. 2, and an extension portion 69 provided to an upper end portion of the body 67 and extending toward substantially the vehicle rear side. A vehicle width direction outer side face (back face) of the body 67 is provided with plural clip mounts and clips attached to the respective clip mounts (neither of these are illustrated in the drawings), so as to be spaced apart from each other along the length direction of the body 67. The clip mounts are provided opposing the fourth wall 36D (see FIG. 2) of the first pillar inner panel 36. The clips attached to the respective clip mounts are inserted into non-illustrated through holes formed penetrating the fourth wall 36D, thereby attaching the front garnish 66 to the first column 26. Note that a vehicle lower side end portion of the body 67 of the front garnish 66 is inserted into a non-illustrated insertion opening formed in an instrument panel 73.

As illustrated in FIG. 2, the body 67 of the front garnish 66 is formed with a substantially U-shaped cross-section profile opening toward substantially the vehicle width direction outer side as sectioned orthogonal to the length direction by a first side wall 67A that covers the first pillar inner panel 36 from the vehicle front side, and a second side wall 67B that opposes the first side wall 67A. Wire harnesses 78 and a hose 80 are routed between the first side wall 67A and the first pillar inner panel 36.

As illustrated in FIG. 1, the extension portion 69 of the front garnish 66 is formed integrally to the body 67, and a vehicle upper side end portion of the extension portion 69 abuts a roof headliner 84. An upper end portion of the rear garnish 68A abuts so as to overlap a rear end portion 69A of the extension portion 69.

The rear garnish 68 extends along substantially the vehicle vertical direction following the second column 28 illustrated in FIG. 2. As illustrated in FIG. 2, the rear garnish 68 is formed with a substantially U-shaped cross-section profile opening toward substantially the vehicle width direction outer side as sectioned orthogonally to the length direction by a first side wall 68A extending along substantially the vehicle width direction and a second side wall 68B opposing the first side wall 68A. The first side wall 68A is spaced apart from the second wall 40B of the second pillar inner panel 40 of the second column 28, and extends in substantially the same plane as the second wall 40B. The second side wall 68B extends as far as the vehicle rear side of the flange 40P and the flange 44P, and a vehicle width direction outer side end portion 68D of the second side wall 68B is disposed so as to overlap a lip 72A of the opening trim 72 in the vehicle front-rear direction.

A clip mount and a tether clip attached to the clip mount (neither of these are illustrated in the drawings) are provided to a vehicle width direction outer face (back face) of the rear garnish 68. Specifically, the clip mount and the tether clip are provided at a location of the rear garnish 68 corresponding to the extension portion 69 (see FIG. 1) of the front garnish 66. The basic configuration of the tether clip is basically the same as a known configuration disclosed for example in JP-A No. 2015-202783, and so detailed explanation thereof is omitted.

A length direction substantially intermediate portion of the rear garnish 68 is provided with clip mounts and clips attached to the clip mounts (neither of these are illustrated in the drawings) that are similar in configuration to those of the front garnish 66.

The tether clip attached to the clip mount provided to the rear garnish 68 is inserted into a non-illustrated through hole formed in the second column 28. The clips attached to the clip mounts of the rear garnish 68 are likewise inserted into other non-illustrated through holes formed in the second column 28. The rear garnish 68 is attached to the second column 28 by the above configuration. Note that similarly to the front garnish 66, a vehicle lower side end portion of the rear garnish 68 is inserted into a non-illustrated insertion opening formed in the instrument panel 73 illustrated in FIG. (see FIG. 1).

Curtain Airbag

A curtain airbag device 88 includes a curtain airbag 88A and a non-illustrated inflator. The curtain airbag 88A inflates and deploys along a vehicle cabin side section when supplied with gas from the inflator, and is formed so as to cover the corresponding front side window 20 and a center pillar (not illustrated in the drawings).

The curtain airbag 88A is normally rolled up into an elongated shape and stowed in a roof side rail provided at an upper end portion of the vehicle cabin side section (not illustrated in the drawings) together with the inflator. In this stowed state, the elongated curtain airbag 88A is configured so as to extend from a length direction substantially intermediate portion of the second column 28 of the front pillar 24 to an upper end side of a non-illustrated rear pillar so as to follow the roof side rail. The basic configuration of the curtain airbag 88A is basically the same as a known configuration disclosed for example in JP-A No. 2012-40963, and so detailed explanation thereof is omitted. The curtain airbag 88A is retained in the second column 28 using an airbag clip 88B.

Operation

Explanation follows regarding operation of the present exemplary embodiment.

As illustrated in FIG. 2, in the present exemplary embodiment, the vehicle pillar structure 10 includes the first column 26, the second column 28, and the front pillar outer glass 50. The first column 26 configures part of the front pillar 24, and includes the first pillar inner panel 36 and the first pillar outer panel 38. The first pillar inner panel 36 is formed in a substantially plate shape extending along substantially the vehicle vertical direction. The first pillar outer panel 38 is formed in a substantially plate shape extending along substantially the vehicle vertical direction similarly to the first pillar inner panel 36, and is disposed opposing the first pillar inner panel 36. The first pillar inner panel 36 and the first pillar outer panel 38 are joined by superimposing and welding together the vehicle front side end portions 36J, 38H, and are also joined by welding together the flanges at the vehicle rear side end portions 36J, 38J. Namely, flanges are not required in order to join the first pillar inner panel 36 and the first pillar outer panel 38 together at the vehicle front side of the first column 26. This enables the width of the first column 26 to be made narrower. The second column 28 configures another part of the front pillar 24 and is disposed spaced apart from and at the vehicle rear side of the first column 26 with the predetermined spacing therebetween, and includes the second pillar inner panel 40 and the second pillar outer panel 44. The second pillar inner panel 40 is formed in a substantially plate shape extending along substantially the vehicle vertical direction. The second pillar outer panel 44 is formed in a substantially plate shape extending along substantially the vehicle vertical direction similarly to the second pillar inner panel 40, and is disposed opposing the second pillar inner panel 40. The second pillar inner panel 40 and the second pillar outer panel 44 are joined by superimposing and welding together the vehicle front side end portions 40G, 44M, and are also joined by welding together the flanges at the vehicle rear side end portions 40H, 44N. Namely, similarly to the first column 26, flanges are not required in order to join the second pillar inner panel 40 and the second pillar outer panel 44 together at the vehicle front side of the second column 28. This enables the width of the second column 28 to be made narrower. A wider field of vision can be obtained for the driver due to the overall width of the front pillar 24 being narrower, and the driver is able to see a target object on the far side of the front pillar 24 through the front pillar outer glass 50 spanning between the first column 26 and the second column 28, thereby enabling an even wider field of vision to be obtained.

In a frontal collision, when collision load is input to the front pillar 24, the front pillar 24 buckles into a shape protruding toward substantially the vehicle upper side in vehicle side view, as illustrated in FIG. 3. Accordingly, a load (referred to hereafter as "tensile load") stretching the front pillar 24 along the extension direction (substantially the vehicle vertical direction) acts on a vehicle front portion of the first column 26 and a vehicle front portion of the second column 28. Specifically, as illustrated in FIG. 2, during a frontal collision, tensile load acts on the first column 26 in a range F further toward the vehicle front side than a central plane C running along the vehicle width direction so as to pass through substantially the vehicle front-rear direction center of the first column 26. At the same time, a load (referred to hereafter as "compression load") compressing the front pillar 24 along the extension direction acts on the first column 26 in a range R further toward the vehicle rear side than the central plane C. Similarly, in the second column 28, during a frontal collision tensile load acts in a range F further toward the vehicle front side than a central plane C running along the vehicle width direction so as to pass through substantially the vehicle front-rear direction center of the second column 28. At the same time, compression load acts on the second column 28 in a range R further toward the vehicle rear side than the central plane C. Note that since the vehicle front portions of the first column 26 and the second column 28 are superimposed and welded and do not include flanges projecting toward the outside of the front pillar 24 from the first column 26 and the second column 28, such flanges can be suppressed from acting as fracture origins due to a concentration of stress at flange leading ends. Namely, configuring the first column 26 and the second column 28 in tube shapes enables bending rigidity to be raised while suppressing fracturing when collision load is input in a frontal collision. This enables both a wide field of vision to be secured when driving the vehicle, and improved collision performance in a frontal collision.

The first pillar inner panel 36 and the first pillar outer panel 38 are joined by superimposing and welding together the vehicle front side end portions 36H, 38H. Namely, joint strength can be increased since the joint surface area can be made larger than in configurations in which an end portion of one member is joined to an end face of another member, such as in butt welding.

The first column superimposed welding portion of the first column 26 and the second column superimposed welding portion of the second column 28 are provided at positions that do not overlap with the respective ridge lines 36E, 36F, 36Q, 38E, 38F, 38G, 40D, 40E, 44G, 44H, 44J, 44K, 44L of the first column 26 and the second column 28. The ridge lines 36E, 36F, 36G, 38E, 38F, 38G, 40D, 40E, 44G, 44H, 44J, 44K, 44L extend along the respective extension directions of the first column 26 and the second column 28, and collision load is concentrated thereon in a frontal collision. Namely, since the first column superimposed welding portion and the second column superimposed welding portion are provided at locations other than the respective ridge lines 36E, 36F, 36G, 38E, 38F, 38G, 40D, 40E, 44G, 44H, 44J, 44K, 44L, collision load does not concentrate at the welding locations, these being locations that are generally more vulnerable to fracture. This thereby enables fracture of the front pillar 24 to be suppressed when collision load is input in a frontal collision.

Moreover, since the plural ridge lines 44G to 44L of the second pillar outer panel 44 are disposed at the vehicle width direction outer side of the second column superimposed welding portion of the second column 28, when collision load is input to the front pillar 24 in a frontal collision, the collision load concentrates at the ridge lines 44G to 44I, of the second pillar outer panel 44 instead of at the second column superimposed welding portion. The second pillar outer panel 44 is configured from high tensile sheet steel, thus enabling the collision load that concentrates at the ridge lines 44G to 44L to be effectively dispersed. This thereby enables collision performance to be further improved in a frontal collision.

The side member outer panel 45 is joined to the second wall 44B, this being a vehicle width direction outer side location of the second column 28. The second column superimposed welding portion of the second column 28 is provided at a location other than the side member welding portion of the second column 28. Namely, since there is no need to weld the side member outer panel 45 at the same time as superimposing and welding together the second pillar inner panel 40 and the second pillar outer panel 44 of the second column 28, the welding can be simplified. This thereby enables manufacturing efficiency to be improved.

Since the second column superimposed welding portion of the second column 28 is inclined in a direction away from the first column 26 in vehicle plan view, the second column superimposed welding portion of the second column 28 is less visible to the driver when the driver is viewing a target object on the far side of the front pillar 24 through the front pillar outer glass 50 between the first column 26 and the second column 28. Namely, the second column superimposed welding portion of the second column 28 can be made less noticeable.

Moreover, the front molding 48 is attached to a location of a vehicle inner face of the front pillar outer glass 50 that overlaps the first column 26, and the front molding 48 is provided with the front screening portion 48AB. The front screening portion 48AB is disposed spaced apart from and on the second column 28 side of the first column superimposed welding portion of the first column 26, and the leading end portion 48AE extends so as to approach the first column 26, Accordingly, the first column superimposed welding portion of the first column 26 is covered from the second column 28 side, namely the vehicle rear side, by the front screening portion 48AB. The first column superimposed welding portion of the first column 26 can accordingly be made less noticeable when the driver views a target object on the far side of the front pillar 24 through the front pillar outer glass 50 between the first column 26 and the second column 28, and when the first column 26 is viewed from outside the vehicle through the front pillar outer glass 50.

The rear molding 49 is attached to a location of the vehicle inner face of the front pillar outer glass 50 that overlaps the second column 28, and the rear molding 49 is provided with the rear screening portion 49B. The rear screening portion 49B is disposed spaced apart from and on the first column 26 side of the second column superimposed welding portion of the second column 28, and the leading end portion 49BA extends so as to approach the second column 28. Accordingly, the second column superimposed welding portion of the second column 28 is covered from the first column 26 side, namely from the vehicle front side, by the rear screening portion 49B. The second column superimposed welding portion of the second column 28 can accordingly be made less noticeable when the driver views a target object on the far side of the front pillar 24 through the front pillar outer glass 50 between the first column 26 and the second column 28, and when the second column 28 is viewed from outside the vehicle through the front pillar outer glass 50, These factors enable external styling properties to be improved.

Although in the exemplary embodiment described above, the leading end portion 48AE of the front screening portion 48AB of the front molding 48 is configured extending so as to approach the first column 26, there is no limitation thereto, and the leading end portion 48AE may be configured so as to abut the first column 26. Similarly, although the leading end portion 49BA of the rear screening portion 49B of the rear molding 49 is configured extending so as to approach the second column 28, there is no limitation thereto, and the leading end portion 49BA may be configured so as to abut the second column 28.

Although the first pillar inner panel 36 and the first pillar outer panel 38 are joined by superimposing and welding together the vehicle front side end portions 36H, 38H, there is no limitation thereto, and the vehicle rear side end portions 36J, 38J may be superimposed and welded together as well.

Although the fourth framework member is configured from high tensile sheet steel, there is no limitation thereto, and the fourth framework member may be configured from sheet steel other than high tensile sheet steel. Moreover, the first pillar inner panel 36, the first pillar outer panel 38, and the second pillar inner panel 40 may be configured from high tensile sheet steel.

Moreover, although the plural ridge lines 44G to 44L of the second pillar outer panel 44 are disposed at the vehicle width direction outer side of the second column superimposed welding portion of the second column 28, there is no limitation thereto. Configuration may be made in which a single ridge line is disposed at the vehicle width direction outer side of the second column superimposed welding portion of the second column 28, or configuration may be made in which no ridge lines are disposed at the vehicle width direction outer side of the second column superimposed welding portion of the second column 28. Similarly to the second column 28, the first column 26 may be configured such that plural ridge lines are disposed, or such that no ridge lines are disposed, at the vehicle width direction outer side of the first column superimposed welding portion.

Although the second column superimposed welding portion of the second column 28 is provided at a location other than the side member welding portion of the second column 28, there is no limitation thereto, and the second column superimposed welding portion may be provided at the side member welding portion.

Although the second column superimposed welding portion of the second column 28 is inclined in a direction away from the first column 26 in vehicle plan view, there is no limitation thereto, and configuration may be made in which the second column superimposed welding portion is inclined in another direction, or configuration may be made in which the second column superimposed welding portion is not inclined.

Moreover, although the front screening portion 48AB is provided to the front molding 48, there is no limitation thereto, and configuration may be made in which the front screening portion 48AB is not provided. Similarly, although the rear screening portion 49B is provided to the rear molding 49, there is no limitation thereto, and configuration may be made in which the rear screening portion 49B is not provided.

Explanation has been given regarding an exemplary embodiment of the present disclosure. However, the present disclosure is not limited to the above, and obviously various other modifications may be implemented within a range not departing from the spirit of the present disclosure.

What is claimed is:

1. A vehicle pillar structure, comprising:
a first column that configures a part of a front pillar, that includes a first framework member formed in a substantially plate shape extending along substantially a vehicle vertical direction, that includes a second framework member formed in a substantially plate shape extending along substantially the vehicle vertical direction and opposing the first framework member, and that is configured in a tube shape wherein vehicle front side end portions of the first framework member and the second framework member are superimposed and welded together and flanges at vehicle rear side end portions of the first framework member and the second framework member are welded together;
a second column that configures another part of the front pillar and is disposed at a vehicle rear side of the first column with a predetermined spacing between the first column and the second column, that includes a third framework member formed in a substantially plate shape extending along substantially the vehicle vertical direction, that includes a fourth framework member formed in a substantially plate shape extending along substantially the vehicle vertical direction and opposing the third framework member, and that is configured in a tube shape wherein vehicle front side end portions of the third framework member and the fourth framework member are superimposed and welded together and flanges at vehicle rear side end portions of the third framework member and the fourth framework member are welded together; and
a transparent member that extends between the first column and the second column, and that enables an exterior environment of a vehicle to be seen when viewed from a driving seat side.

2. The vehicle pillar structure of claim 1, wherein a superimposed welding location of the first column and a superimposed welding location of the second column are provided at positions that do not overlap respective ridge lines extending along respective extension directions of the first column and the second column.

3. The vehicle pillar structure of claim 2, wherein a vehicle width direction outer side portion of the second column is comprises the fourth framework member, which is configured from high tensile sheet steel, and a plurality of ridge lines of the fourth framework member are disposed at a vehicle width direction outer side of the superimposed welding location of the second column.

4. The vehicle pillar structure of claim 1, wherein a side member outer panel is joined to a vehicle width direction outer side portion of the second column, and a superimposed welding location of the second column is provided at a portion other than the portion to which the side member outer panel is joined.

5. The vehicle pillar structure of claim 1, wherein a superimposed welding location of the second column is inclined in a direction away from the first column in vehicle plan view.

6. The vehicle pillar structure of claim 1, wherein:
a molding member is attached to a portion, of a vehicle inner face of the transparent member, that overlaps the first column; and
the molding member is provided with a front screening portion that is separated from, and on the second column side of, a superimposed welding location of the first column and that extends such that a leading end portion of the front screening portion approaches or abuts the first column.

7. The vehicle pillar structure of claim 1, Wherein:
a molding member is attached to a portion, of a vehicle inner face of the transparent member, that overlaps the second column; and
the molding member is provided with a rear screening portion that is separated from, and on the first column side of, a superimposed welding location of the second column and that extends such that a leading end portion of the rear screening portion approaches or abuts the second column.

* * * * *